United States Patent [19]

Seiffert

[11] Patent Number: 4,518,343

[45] Date of Patent: May 21, 1985

[54] EXTRUSION DIE

[75] Inventor: Edward J. Seiffert, Wilmington, Del.

[73] Assignee: E. I. Du Pont de Nemours and Company, Wilmington, Del.

[21] Appl. No.: 472,643

[22] Filed: Mar. 7, 1983

[51] Int. Cl.[3] .............................................. B29F 3/04
[52] U.S. Cl. .............................. 425/466; 264/209.8; 425/376 A; 425/381; 425/467
[58] Field of Search ............... 425/381, 380, 465, 466, 425/192 R, 376 A, 467, 326.1; 264/209.8, 209.1, 209.3, 209.4

[56] References Cited

U.S. PATENT DOCUMENTS

| | | | |
|---|---|---|---|
| 2,769,200 | 11/1956 | Longstreth et al. | 425/466 |
| 2,952,872 | 9/1960 | Buteux et al. | 425/466 |
| 3,079,636 | 3/1963 | Aykanian | 425/466 |
| 3,122,790 | 3/1964 | Albert | 425/466 |
| 3,203,048 | 8/1965 | Daubenfeld | 425/192 R |
| 3,349,436 | 10/1967 | Bosch | 425/466 |
| 3,488,669 | 1/1970 | Goodrum et al. | 425/192 R |
| 3,491,406 | 1/1970 | Davidson | 425/466 |
| 3,492,694 | 2/1970 | Morin | 425/466 |
| 3,809,515 | 5/1974 | Farrell | 425/133 |
| 3,884,611 | 5/1975 | Anderson et al. | 425/376 |
| 3,912,240 | 10/1975 | Smith et al. | 425/380 |
| 4,084,933 | 4/1978 | Reitemeyer et al. | 425/380 |

FOREIGN PATENT DOCUMENTS

| | | | |
|---|---|---|---|
| 1928883 | 12/1970 | Fed. Rep. of Germany | 425/466 |
| 1031670 | 6/1966 | United Kingdom | 425/381 |

Primary Examiner—Jeffery R. Thurlow

[57] ABSTRACT

A thermoplastic pipe extrusion die having an adjustment section in a radial portion of the die channel provides excellent control of final pipe wall thickness uniformity.

4 Claims, 1 Drawing Figure

U.S. Patent May 21, 1985 4,518,343
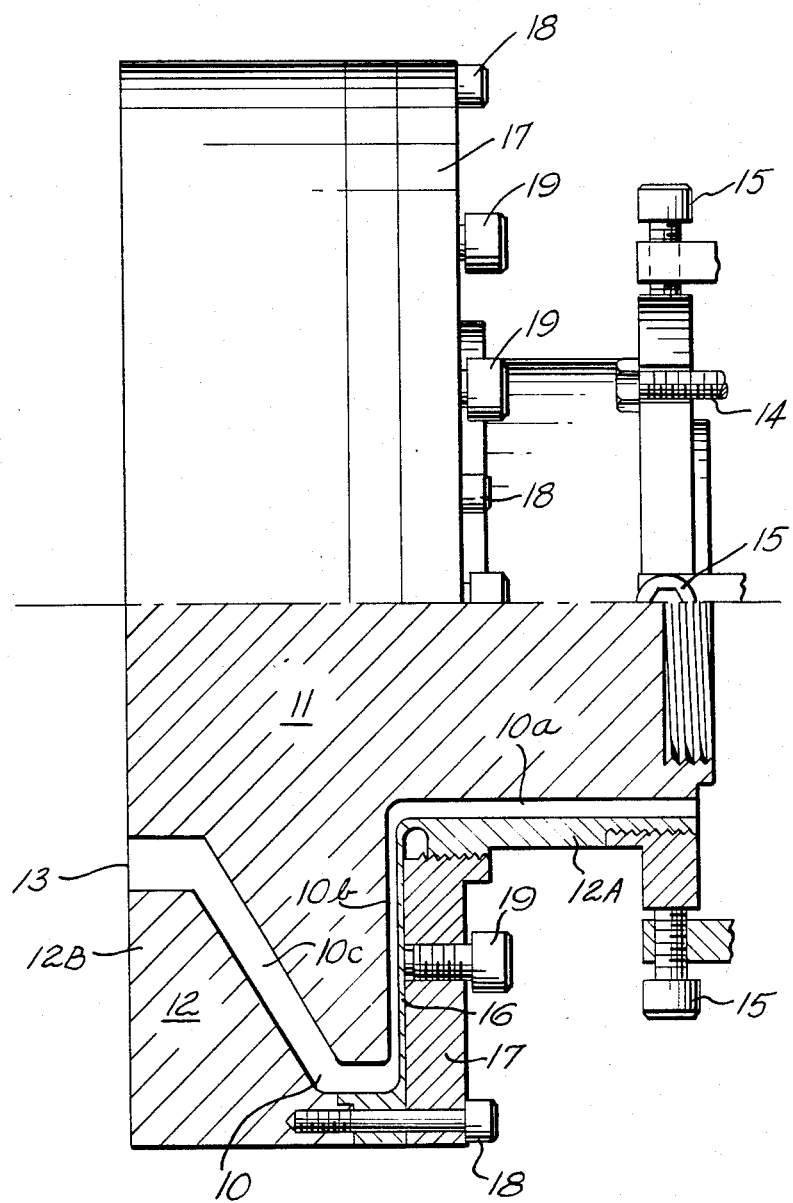

4,518,343

EXTRUSION DIE

BACKGROUND OF THE INVENTION

Thermoplastic pipe is produced from polymeric materials such as polyethylene, polypropylene, polyvinylchloride, polymethylmethacrylate, polyamide, polycarbonates, polyester and fluorinated polymers. Such pipe is used extensively in gas, sewer, water and drainage applications.

The extrusion of thermoplastic pipe is generally carried out horizontally, and there are two factors that contribute to circumferential nonuniformity of wall thickness of the pipe. The first is imperfect melt distribution or velocity of the polymer around the circumference of a given cylindrical melt path. In general, this imperfect melt distribution cannot be corrected by conventional die adjustments where the outer die is moved radially with respect to the mandrel.

A second factor causing nonuniform pipe wall thickness, especially on relatively thick wall products, is that gravitational forces acting on the still molten polymeric extrudate cause a downward flow of the molten polymer. For example, if the die orifice is adjusted so that the opening is perfectly concentric, the resultant pipe will generally be substantially thicker at the bottom portion than at the upper most portion even though the melt velocity at all points around the die orifice is substantially uniform. To compensate for this downward molten polymer flow, the outer die is generally moved upward with respect to the mandrel so that the die orifice is larger on the top than on the bottom to the degree necessary for the final solidified pipe wall thickness, as measured at the top and bottom, to be nearly equal.

Even with ideal die adjustment of a conventional pipe extrusion die as outlined above, significant pipe wall thickness nonuniformity still exists. In particular, significant increases in wall thickness often occur in the lower two quadrants of the cylindrical pipe; specifically 15° to 60° toward each side as measured from the pipe bottom point. No method currently exists to independently adjust the pipe wall thickness at these specific locations because the outer die has generally been moved with respect to the mandrel such that the solidified pipe wall thickness is nearly equal top and bottom, and nearly equal on each side, though the vertical average wall thickness need not necessarily equal the horizontal average wall thickness.

Aside from normal die adjustment where the outer die is moved with respect to the mandrel, additional localized adjustment of any thin wall cylindrical or conical section of the die would be difficult and impractical, since the inward deformation of such a section would result in uncontrolled bulging at another location about its circumference, and concurrent, uncontrolled redistribution of the polymer.

SUMMARY OF THE INVENTION

The instant invention provides an improved apparatus for the extrusion of polymeric tubular shapes which permits independent, localized adjustment of the thickness of the cylinder wall as extruded without significally affecting the thickness of other portions of the cylinder wall.

Specifically, the instant invention provides, in a die for the extrusion of molten polymeric material in a tubular configuration having a tubular channel therein for polymer flow extending from a polymer feed end of the die to a die orifice and having a first, inlet section extending substantially parallel to the direction of extrusion, a second section extending from the end of the first section substantially radially with respect to the direction of extrusion, and a third, outlet section extending from the end of the second, radial section to the die orifice, the improvement wherein the second, radial section is defined by opposing surfaces, at least a portion of one opposing surface being deformable by an adjustment force applied to the deformable portion externally and deforming means associated with the deformable portion of the surface.

BRIEF DESCRIPTION OF THE FIGURE

The FIGURE is a side view of a die of the present invention, with one half of the die being shown in cross section.

DETAILED DESCRIPTION OF THE INVENTION

Turning to the FIGURE, a channel, generally designated as 10, is defined by mandrel 11 and outer die element 12. Outer die element 12 can be composed of upstream section 12A and downstream section 12B. The first, inlet portion of the channel 10A is connected with a supply of molten thermoplastic material (not shown), and carries the thermoplastic material in a cylindrical configuration to a second, radial, channel section 10B. The radial channel section carries the molten thermoplastic material to a third, outlet, channel section 10C which carries the molten thermoplastic to die orifice 13.

Adjustment of the pipe wall thickness is accomplished in two ways. First, the outer die element 12, which is attached to an upstream adapter (not shown) by a plurality of bolts 14, can be moved radially in any direction with respect to the mandrel by adjustment of bolts 15 as is the conventional method of extrusion die adjustment.

Additional wall adjustment is effected in the second, radial channel section 10B by movement of deformable portion 16 which forms a part of the outer die element 12. The die portion providing the deformable portion 16 is substantially thinner than the remaining sections of the outer die element. The thickness of this deformable portion 16 preferably does not vary either across its length or with die size or with the material of construction. When using many alloy steels, a thickness of about from 0.020 to 0.060 inch will provide sufficient flexibility. A thickness of about 0.035 inch has been found to be particularly satisfactory when using AISI 4130 steel heat treated to a hardness of $R_c$ 28–32 for construction of the outer die element.

Control of the channel 10B width is accomplished through circular flange 17 which is, at its inside diameter, threaded onto the outer die 12 and, near its outside diameter, attached to the outer die element by threaded bolts 18. Adjusting bolts 19 are threaded into the flange 17 on a circumference generally corresponding to the radial midpoint of the deformable portion in such a way that forward movement of one or more of the bolts deflects the thin deformable portion 16 of the outer die element inwardly, narrowing the second radial channel section 10B at that location. The number of adjusting bolts will, of course, vary with the size of the die and the degree of precision desired in adjustment. Typically, adjusting bolts spaced about one inch apart are provided in the flange.

The width of the radial channel 10B when the adjusting bolts 19 are not bearing against the deformable surface 16 is preferably constant across its surface area. However, if desired, by tapering the face of the mandrel, the channel width can be made to converge such that, for example, the melt velocity would be constant across the length of the channel.

Surprisingly, it has been found that adjustment of the channel thickness within the second, radial channel section 10B provides an efficient and reliable means of adjusting the pipe wall to a uniform thickness. Contrary to expectation, an adjustment of the channel width to regulate the melt flow rate at a given location within the radial section 10B is not equalized over the remainder of the melt flow path leading to the die orifice. Further, the application of adjusting forces in the radial section of the channel permit adjusting the polymer flow over a narrow span at the point of adjustment with negligible influence on the flow rate in other portions of the extruded polymer.

The circumferential position of adjustment bolts 19 which are adjusted inwardly to deflect the deformable portion 16 to change the wall thickness on some medium density polyethylene pipe products may be physically located closer to the top of the die than is indicated by the portion to be adjusted in the final solidified pipe. Further, with some high density polyethylene pipe products where the melt strength is greater than with medium density polymers, the bolt 19 position can be in line with the portion to be adjusted in the final pipe product. This results in another advantage of the present design. The design provides, with the plurality of bolts 19, the ability to adjust the deformable portion to accomodate polymers of different melt strengths and to equalize the effects of other processing variables such as melt temperature and cooling rate as they relate to the final pipe wall thickness non-uniformity, and, as mentioned previously, to accommodate imperfections in melt distribution or velocity of the polymer entering or within the die regardless of where they may occur. The use of the present invention is further illustrated by the following specific Example.

EXAMPLE

A nominal 6" iron pipe size (IPS) standard dimension ratio (SDR) 11.5 pipe was extruded using medium density polyethylene having a melt index of 1.2 as measured by ASTM-D-1238, Condition E. The polymer was extruded through a die of the type shown in the FIGURE having 32 adjusting bolts in the flange. Through adjustment of the deformable portion of the outer die element, the circumferential wall variation was reduced from 0.050–0.060 inch to 0.010–0.020 inch without any reduction in extrusion rate as compared to a similar die but without the circular adjustment flange and deformable surface in the radial section of the die.

I claim:
1. In a die for the extrusion of molten polymeric material in a tubular configuration having a tubular channel therein for polymer flow extending from a polymer feed end of the die to a die orifice and having a first, inlet section extending substantially parallel to the direction of extrusion, a second section extending from the end of the first section substantially radially with respect to the direction of extrusion and at substantially a right angle to the inlet section, and a third, outlet section extending from the end of the second, radial section to the die orifice, the improvement wherein the second, radial section is defined by opposing surfaces, at least a portion of one opposing surface being deformable by an adjustment force applied to the deformable portion externally and deforming means associated with the deformable portion of the surface.

2. A die of claim 1 wherein the first, inlet portion of the channel is cylindrical and extends substantially axially from the polymer feed end of the die toward the die orifice.

3. A die of claim 1 wherein the deforming means is a circular flange attached to the die having a plurality of bolts threadably engaged therein such that the forward movement of each bolt deflects a portion of the deformable surface.

4. A die of claim 3 wherein the bolts are positioned at regular intervals around the flange.

* * * * *